Nov. 26, 1968     D. C. PRICE     3,412,593
MANUFACTURE OF PLATE METAL PRODUCTS WITH EXTENDED
EXTRUDED INTEGRAL SLEEVES

Filed Dec. 16, 1965     2 Sheets-Sheet 1

INVENTOR.
*Don C. Price*
BY
*Frease, Bishop & Schick*
ATTORNEYS 3,412,593
MANUFACTURE OF PLATE METAL PRODUCTS WITH EXTENDED EXTRUDED INTEGRAL SLEEVES
Don C. Price, Canton, Ohio, assignor to The Monarch Rubber Company, Hartville, Ohio, a corporation of Ohio
Filed Dec. 16, 1965, Ser. No. 514,277
1 Claim. (Cl. 72—335)

ABSTRACT OF THE DISCLOSURE

A thick plate metal product having flat surfaces and an integral sleeve projecting from one surface a restricted distance but with an increased sleeve length of at least two and one-half times the plate metal thickness is made by piercing a hole through the plate metal blank, then shaving the hole to be truly cylindrical, then drawing a dome-like formation around the hole offset in one direction from the flat blank surfaces and reforming the cylindrical hole to conical shape, and then extruding a sleeve from blank metal in the dome-like formation to project from the concave dome surface beyond the connected flat blank surface.

---

The new plate metal products of the invention and their manufacture comprise improvements upon the extruded sleeve structures and manufacture set forth in my copending application Ser. No. 419,634 filed Dec. 21, 1964, and Ser. No. 411,753 filed Nov. 17, 1964, issued respectively as Patents Nos. 3,365,997 and 3,365,926.

The invention relates to a plate metal product and to the manufacture of a plate metal product, having an extruded integral tubular sleeve, neck, ring or thimble, which may be formed internally with threads, and which sleeve projects from at least one surface of the plate metal blank from which the sleeve is extruded. More particularly the invention relates to such plate metal products and the manufacture thereof in which the sleeve wall thickness is sufficient to permit threads to be formed therein having a thread profile in excess of 75% of full thread profile; and in which the extruded sleeve length (and thus the number of threads which may be formed in such sleeve) is substantially greater than the length of extruded sleeve which ordinarily may be produced in a sleeve with the same diameter and sleeve wall thickness from the same gauge plate metal as disclosed in said applications Ser. Nos. 411,753 and 419,634.

Similarly the invention relates to the provision, in a plate metal part having an integral threaded sleeve wherein the distance that the sleeve may project from one surface of the part is restricted, of a substantially greater effective sleeve length so that a sufficient number of threads may be formed in the sleeve to sustain high torque loading, which number of threads could not be formed in a sleeve having a projected length within the restriction requirements.

The advent of plate metal products with extruded integral threaded sleeves which provide integral threaded fasteners has created a demand for different sleeve structure arrangements, longer sleeve lengths, and more threads than heretofore was possible to produce.

I have discovered a new procedure which enables the internal or overall length of sleeve in an extruded integral sleeve structure (which may be threaded) in a plate metal product to be increased, thereby enabling more threads to be formed in the sleeve, and which enables effective sleeve length to be increased while satisfying restrictions as to the distance that a sleeve may project from one surface of the plate metal part involved, while at the same time retaining all the benefits, new characteristics and advantages of extruded sleeve structures integral in plate metal products, either unthreaded or threaded, and of their manufacture.

Accordingly, it is an object of the present invention to provide new plate metal products having extended extruded integral sleeves formed therein which may be threaded; to provide new procedures for the manufacture of such products; to eliminate difficulties heretofore existing in the art; and to obtain the indicated objects in a simple, effective and inexpensive manner, thereby satisfying needs existing in the art.

These and other objects and advantages apparent to those skilled in the art from the following description and claims may be obtained, the stated results achieved and the described difficulties overcome, by the products, structures, devices, elements, arrangements, parts, methods, steps, procedures and discoveries which comprise the present invention, the nature of which are set forth in the following general statements, preferred embodiments of which—illustrative of the best modes in which applicant has contemplated applying the principles—are set forth in the following description and shown in the drawings, and which are particularly and distinctly pointed out and set forth in the appended claim forming part hereof.

The nature of one aspect of the invention may be stated in general terms as including a plate metal product having an extruded integral sleeve, a plate metal, preferably steel, wall; a tubular sleeve having an inner surface forming a sleeve opening cold extruded under pressure from the plate metal projecting integrally from at least one surface of the wall; the plate metal wall having a raised annular dome-like formation providing opposite convex and concave surface portions offset in one direction from connected flat surfaces of said wall, the convex surface portion surrounding the sleeve opening at one end of the sleeve; the sleeve projecting from the concave surface portion of the wall and extending beyond the plane of the flat wall surface connected with said concave surface portion at least a distance approximating the wall thickness; and the sleeve having a sleeve opening length in excess of at least two and one-half times the wall thickness.

The nature of another aspect of the invention may be stated in general terms as preferably including in the manufacture of a plate metal product having an extruded sleeve projecting integrally from at least one surface of the product, the steps of providing a plate metal, preferably steel, blank; piercing a hole in the blank; then shaving the annular surface of the pierced hole to eliminate normal metal breakout resulting from piercing; then reforming the metal in the blank annularly around the shaved hole to dome-like formation with opposite concave and convex surface portions offset in one direction from connected flat surfaces of the blank; then cold extruding a tubular sleeve of desired length from blank metal in the dome-like formation surrounding the shaved hole to project from said concave surface portion of the blank; and then preferably roll-tapping the inner metal surface of the tubular metal sleeve.

By way of example, the improved products and procedures for the manufacture thereof are shown somewhat diagrammatically in the accompanying drawings forming part hereof in which.

Similar numerals refer to similar parts throughout the various figures of the drawings.

The improved product is shown in FIGS. 5, 6, 10, 11 and 12. The method of manufacture thereof is illustrated diagrammatically in FIGS. 1 to 4 and 7 and 8, die means for the cold extrusion step being illustrated in FIGS. 7, 8 and 9.

While the drawings indicate only one sleeve formed in one plate metal blank, more than one sleeve may be formed by duplicating the dies and other tools used at each stage of the procedure. Also, the blank is not necessarily merely a flat blank but may have flanges formed therein at certain stages to form the shape of metal stamping desired.

Figure 1:
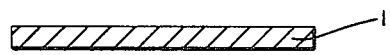
FIGURE 1 is a sectional view of a sheet or plate metal blank in which the improved integral sleeve is to be extruded.
Figure 2:
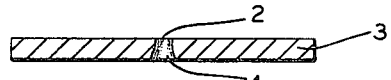
FIG. 2 is a somewhat diagrammatic sectional view illustrating the first or piercing step carried out.
Figure 3:
FIG. 3 is a diagrammatic sectional view illustrating the next or shaving step.

Plate metal blank 1 (FIG. 1) has the required size and thickness to form the desired finished stamped plate metal component from which an integral sleeve projects. The first step in forming the improved product is a usual piercing step which may be carried out in usual die means to form a pierced opening 2 in intermediate blank 3 (FIG. 2). Metal breakout at the bottom of pierced hole 2 occurs when plate metal is pierced extending through a portion of the metal thickness, the breakout being diagrammatically indicate at 4 in FIG. 2. The pierced opening 2 in accordance with usual practice will have a diameter slightly less than or substantially equal to but not greater than the thickness of metal pierced, that is the thickness of blank 1.

In order successfully to extrude a sleeve of any substantial length and wall thickness from a relatively thick plate metal blank 3, the metal breakout 4 in pierced hole 2 must be removed. This preferably is carried out by a shaving operation in which a punch is used to form a truly cylindrical shaved hole 5 in shaved blank 6 illustrated in FIG. 3.

Figure 4:
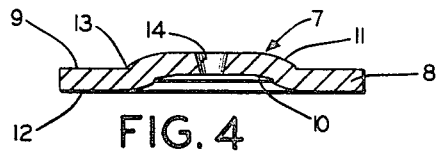
FIG. 4 is a diagrammatic view illustrating the next step carried out to reform the metal with a dome-like formation around the shaved hole of FIG. 3.
Figure 5:
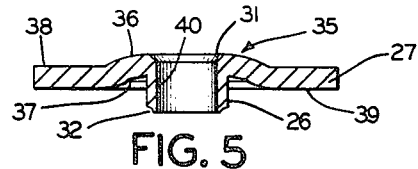
FIG. 5 is a similar view illustrating the integral sleeve cold extruded from the intermediate blank of FIG. 4.
Figure 6:
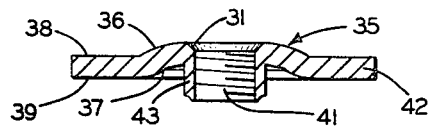
FIG. 6 is a view similar to FIG. 5 showing the sleeve threaded.

The next step in accordance with the invention reforms to dome-like formation the metal around the shaved hole 5 of blank 6 as generally illustrated at 7 in FIG 4. The dome-like or bubble-like formation 7 in intermediate blank 8 projects from one or the top surface 9 of blank 8, and is formed by a drawing operation in which a punch-like die shapes the undersurface 10 of dome-like formation 7. Top surface 9 of blank 8 is thus pushed into a die cavity permitting the upper surface contour 11 of dome-like formation 7 to form freely. The blank metal during dome forming is confined between upper and lower flat blank surfaces 9 and 12 circumferentially outside of the circular zone indicated by point 13 in FIG. 4. As the dome shape 7 is being formed in blank 8 shaved hole 5 of blank 6 is reformed to somewhat conical shape as indicated at 14 in FIG. 4.

Figure 9:
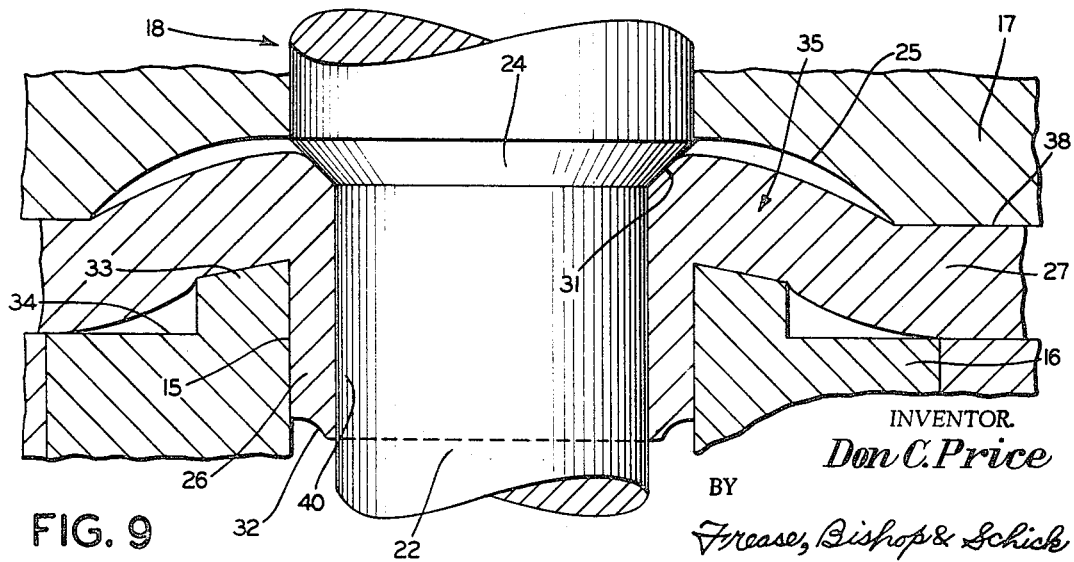
FIG. 9 is a fragmentary greatly enlarged sectional view of a portion of FIG. 8.
Figure 7:
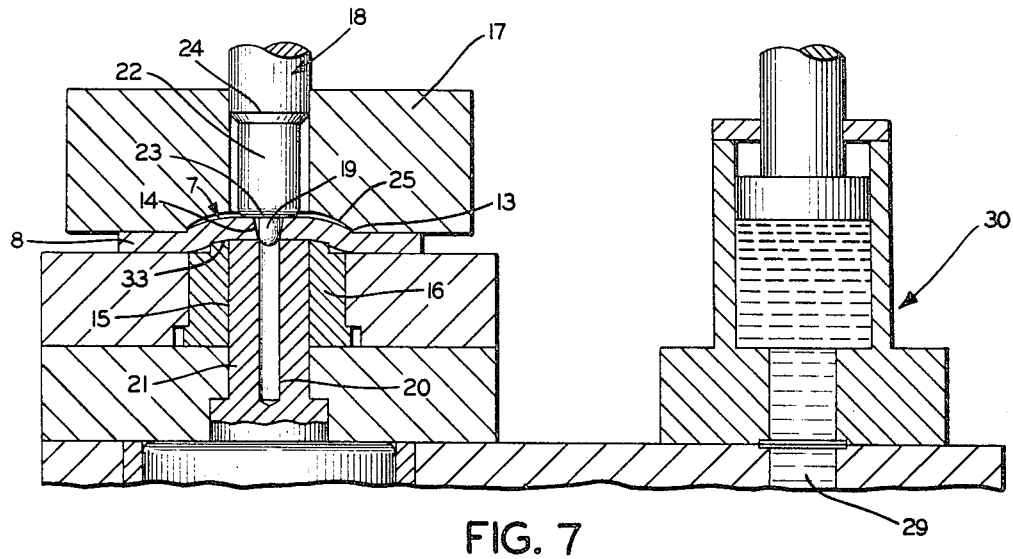
FIG. 7 is a diagrammatic fragmentary sectional view of the die means for cold extruding a sleeve in the intermediate blank of FIG. 4 illustrating the parts at the beginning of cold extrusion.
Figure 8:
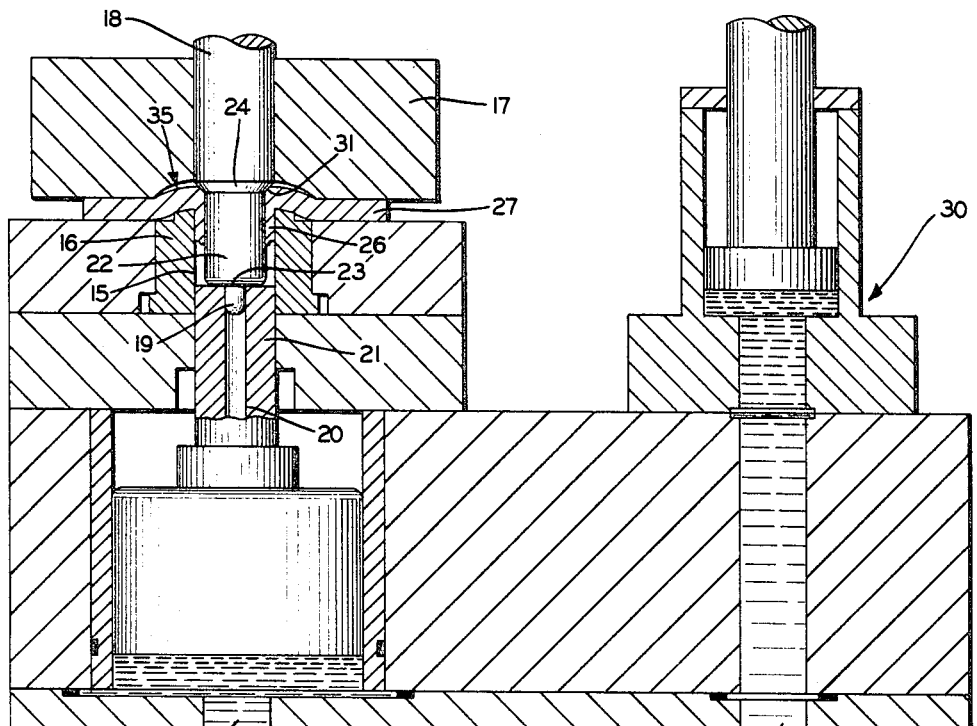
FIG. 8 is a view similar to FIG. 7 illustrating the cold extrusion die means at the conclusion of the cold extrusion operation producing the extruded blank of FIG. 5.

Intermediate blank 8 of FIG. 4 then is extruded in the sleeve cold extrusion die means illustrated in FIGS. 7, 8 and 9. As shown in FIG. 7 the die means includes lower die cavity 15 formed in lower die 16, a blank holder 17 and an extrusion punch 18. Punch 18 is formed at its lower end with a rounded pilot nose 19 having a diameter approximately equal to the smallest diameter of aperture 14 in blank 8 and also equal to the diameter of an opening 20 in movable die support member 21 slidably mounted within die cavity 15. Punch 18 is formed with an enlarged cylindrical portion 22 above nose 19. The lower end of cylindrical portion 22 terminates in a flat work nose 23 from which pilot nose 19 projects. Punch portion 22 terminates at its upper end in a tapered or conical coining shoulder 24 which defines the lower extremity of the larger diameter portion of punch 18.

The position of the various parts of the extrusion die means with a blank 8 contained therein ready to be extruded and with the punch nose 19 entered into aperture 14 of blank 8 and blank 8 held by blank holder 17 is shown in FIG. 7. Blank holder 17 is provided with a recess 25 relieving any contact with blank 8 above the dome-like formation 7 and within the circle defined by point 13, so that blank metal may flow freely in an unconfined manner below the blank holder recess 25 during the extrusion step.

The extrusion operation proceeds and may be controlled in the manner described in detail in my copending application SN 411,753. FIG. 8 shows the extrusion die means at the conclusion of the extrusion operation. Punch portion 22 has completely penetrated the blank and extends through extruded sleeve 26 in extruded blank 27. During the extrusion step the flat nose 23 of punch 18 has engaged the upper end of movable die support member 21 and pushed it downward overcoming hydraulic pressure in passages 28 and 29 established to control the extrusion operation by the hydraulic system generally indicated at 30. Meanwhile, the coining shoulder 24 on punch 18 at the completion of downward punch movement has engaged the blank at the intersection of the top surface of the blank and the inner diameter of the sleeve 26 to form and coin a chamfered corner 31.

Referring particularly to FIG. 9, the extruded blank 27 with the integral extruded sleeve 26 has a somewhat chamfered formation 32 at its lower or open end resulting from the displacement of metal in forwardly extruding the sleeve 26 in the final stage of coining the corner 31 at the upper end of the sleeve opening.

During the extrusion operation the dome-like formation 7 of intermediate blank 8 is supported by die shoulder 33 which is a part of lower die 16. By these means as punch 18 moves downward, metal flows and is drawn from the portion of the blank in the dome-like formation 7 of intermediate blank 8 to form sleeve 26. This metal flow is unconfined and flows freely from the dome-like formation 7 because of recess 25 in blank holder 17 and the relief 34 outside of die shoulder 33.

The extrusion metal flow of the metal from formation 7 to form sleeve 26, while being confined radially between punch 22 and die cavity 15, is controlled axially by hydraulically controlled resistance of movable die support member 21 so that the sleeve metal does not work harden to result in cracking. Likewise, the free flow of metal permitted from the dome-like formation 7 prevents work hardness from developing in the dome area which could otherwise result in the sleeve metal breaking away from its parent blank metal.

Since the formation 7 has such a large volume of metal to draw from to supply metal extruded to form the sleeve, the metal in formation 7 is not appreciably thinner in the dome portion 35 of extruded blank 27. The raised annular dome-like formation 35 in blank 27 provides opposite convex and concave surface portions 36 and 37 offset in one direction from the connected flat surfaces 38 and 39 of the blank wall. Convex portion 36 and coined corner 31 surround the sleeve opening 40 at one end of sleeve 26.

Sleeve 26 projects downward (FIGS. 5 and 9) from concave surface portion 37 and extends beyond flat wall surface 39 connected with concave surface 37 at least a distance approximating the thickness of the metal wall of blank 27. Further, the length of sleeve opening 40 is in excess of at least two and one-half times the thickness of the metal wall of blank 27.

The extruded blank 27 provides a plate metal product that may be used for many purposes. Thus, either the interior or the exterior of sleeve 26 may be used to pilot the location of a sheet metal product having such an extruded tubular sleeve with respect to some other part in an assembly of various components. In other instances, the sleeve opening 40 is threaded. Where the sleeve is to be threaded, the interior surface 40 is drilled to remove a thin skin of metal as described in said application Ser. No. 411,753. This drilling operation removes burrs or score marks which may have resulted from the cold extrusion operation. Also, it removes any contaminating material which may be present on the sleeve opening surface, next it provides a close tolerance sleeve hole size in preparation for a subsequent tapping operation, and finally it removes a thin skin of work hardened metal which exposes clean stress-relieved metal to be tapped.

The sleeve is then tapped by a usual roll-tapping operation preferably with a fluteless roll thread tap to form desired threads in the sleeve without metal loss by cold working the metal in the interior of the sleeve to establish the thread profile. The threaded sleeve is indicated generally at 41 in FIG. 6 which illustrates a finished tapped plate metal product 42 having an extruded integral threaded tubular sleeve 43.

Figure 10:
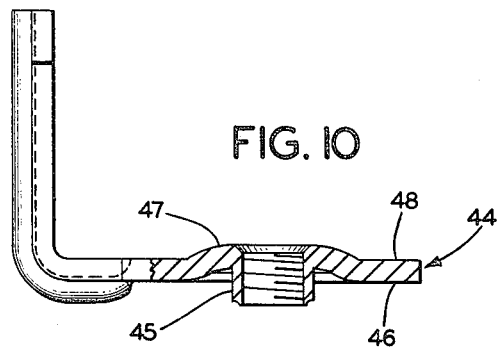
FIG. 10 is a side elevation with parts broken away and in section of a plate metal product incorporating the improved sleeve construction.
Figure 11:
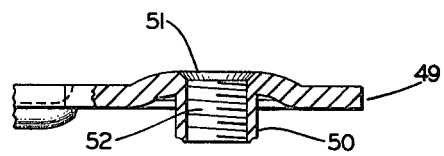
FIG. 11 is a view similar to a portion of FIG. 10 showing a modified construction.

FIG. 10 illustrates a stamped plate metal product 44 having an extruded integral threaded tubular sleeve 45 projecting beyond the flat bottom surface 46 of the product 44. Such a product may later form a component of a composite metal-rubber product concerning which there may be restrictions as to the distance that sleeve 45 may project from flat surface 46. At the same time a minimum number of threads may be required in the sleeve to carry the torque load for which the product is designed.

For example, the plate metal blank may be a 0.155" to 0.165" thick plate and sleeve 45 may have a nominal inside diameter of 0.463" and a nominal outside diameter of 0.600" before threading. The threads may be standard 1/2" threads—20 threads per inch. A requirement may be that sleeve 45 cannot project beyond the flat undersurface 46 of part 44 more than 0.130" to 0.160". Some 7 to 8 or more threads may be required to be formed in the sleeve. The improved construction provided by the dome-like formation 47 which may project upward from the top surface 48 of member 44 about 0.120" or more enables a sleeve length of 0.405" to 0.445" to be provided, which enables from 8 to 9 threads to be formed in the sleeve.

If sleeve 45 were formed in a plate metal part and restricted to projecting only 0.130" to 0.160" from the bottom surface 46 of the part without providing the dome-like formation 47, the total sleeve length would be between 0.285" and 0.325". This would only accommodate from 5 to 6 threads. Thus, the improved construction enables an increase of some 30% or more in the effective sleeve length which may be threaded, in a product wherein the distance that the sleeve may project from one surface of the plate metal blank is restricted.

Under other circumstances, where there is no restriction as to the distance that sleeve 45 may project from undersurface 46 of a product, it has been discovered possible using the concepts of the invention successfully to extrude a sleeve substantially longer than heretofore possible in which threads later may be formed. Thus, the plate metal product 49 of FIG. 11 which is otherwise similar to the product 44 of FIG. 10 may have a longer sleeve 50 extruded from the dome-like formation 51 and threaded at 52. Sleeve 50 may have an overall internal sleeve length of from 0.485" to 0.515" or approximately 1/2". Ten threads thus may be formed in the sleeve having the profile of 1/2" threads —20 threads per inch threads. This is a substantially greater threaded sleeve length than a sleeve length of about 0.415" to 0.450" which is the maximum length that may be obtained where no dome-like formation 51 is provided from which the sleeve 50 is extruded.

An extruded integral threaded tubular sleeve in a plate metal product has self-locking characteristics when tensioning a bolt entered into the sleeve at the end of the sleeve integrally connected with the plate metal wall. That is to say, if a bolt is entered into sleeve 45 or 50 of products 44 or 49 at the top end of either sleeve viewing FIGS. 10 and 11, tension on the bolt tends to pull the threaded sleeve into the sleeve opening at the lower open or free end of the sleeve. This is accompanied by some distortion of the sleeve and provides the self-locking characteristics.

Normally, when a bolt is entered at the open or free end of a similar sleeve projecting from a flat plate wall and the bolt tensioned, no self-locking characteristics are present.

Figure 12:
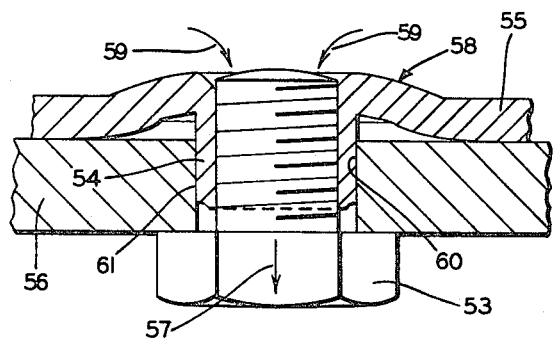
FIG. 12 is an enlarged view of a portion of the improved product bolted to a member with which the product is assembled.

However, I have discovered that when bolt 53 (FIG. 12) is threaded into and tensioned within sleeve 54 of plate metal part 55 to mount part 55 on a member 56, tensioning of the bolt acting in the direction of the arrow 57 tends to pull the sleeve metal where connected with dome-like formation 58 downward and inward as indicated by arrows 59 in FIG. 12. This provides the self-locking characteristic which may be accompanied by some slight distortion of the sleeve and dome-like formation 58. The dome-like formation 58 as explained enables this self-locking characteristic to be developed when the sleeve 54 is entered by a bolt at the free or open end of the sleeve.

FIG. 12 also shows the manner in which the outer surface 60 of sleeve 54, which is concentric with the inner central bore of the sleeve, serves as a pilot surface to accurately locate part 55 with respect to member 56 in the aperture 61 formed in member 56.

One important aspect of the invention is the concept of providing the dome-like formation in the blank and in the extruded product. First of all, this locates additional blank metal in the dome-like formation from which the sleeve is extruded to obtain the greater sleeve lengths, next the cold working incident to forming the dome reinforces and stiffens the plate metal around the zone of the blank from which the sleeve is extruded and projects. Finally, the described self-locking characteristics of the threaded sleeve are obtained for connections by bolts entering the free end of the sleeve.

Another important aspect of the invention is the concept of providing a product having a plate metal wall provided with two flat surfaces with a tubular sleeve extruded from the wall having an inner surface forming a sleeve opening terminating in ends, in which the length of the sleeve between the ends is in excess of at least two and one-half times the wall thickness with one sleeve opening end offset in one direction from one flat plate wall surface and the other sleeve opening end offset in the other direction from the other flat plate wall surface. Thus, a plate metal product is provided with an integral sleeve of considerable length, in which the sleeve only projects from either surface of the plate wall a distance substantially less than the overall sleeve length.

Accordingly, the present invention provides new products having the many new properties and characteristics described, provides a new procedure for the manufacture of a plate metal part with an extruded integral tubular preferably threaded sleeve from heavy gauge metal to obtain longer effective sleeve lengths which may be threaded; and provides products and procedures which solve problems longstanding in the art and achieve the new results indicated.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention, the new procedures and the new products are by way of example and the scope of the invention is not limited to the exact details, sizes, etc. described or shown because various products of various sizes incorporating the fundamental structures may be manufactured by the fundamental procedures and concepts of the invention without departing from the fundamental principles set forth.

The term "plate metal" is used herein to refer to various gauges of material, whether technically known as sheet or plate metal; and it is understood that the term "plate metal" is used comprehensively to include both sheet and plate metal.

Having now described the features, discoveries and principles of the invention, the characteristics of the new products, the manner in which the new procedures may be carried out, and the advantageous, new and useful results obtained thereby; the new and useful products, structures, devices, elements, arrangements, parts, methods, steps, procedures and discoveries, and mechanical equivalents obvious to those skilled in the art are set forth in the appended claim.

I claim:
1. In a method of making a thick plate metal product having flat surfaces and an extruded sleeve projecting integrally from the plate metal beyond one flat surface from a zone beyond the other flat surface; the steps of piercing a hole through a thick plate metal blank having flat surfaces; shaving normal metal breakout from the pierced hole to form a truly cylindrical shaved hole; drawing a dome-like formation with opposite concave and convex surface portions offset in one direction from connected flat surfaces of the blank in the flat blank around the shaved hole and reforming the cylindrical shaved hole to conical shape during the drawing of the dome-like formation; and then cold extruding a tubular sleeve from blank metal in the dome-like formation to project from said concave surface portion beyond the other flat surface of the blank.

References Cited
UNITED STATES PATENTS

| | | | |
|---|---|---|---|
| 2,157,354 | 5/1939 | Sherman | 29—545 |
| 2,287,691 | 6/1942 | Marchou | 72—377 X |
| 2,552,794 | 5/1951 | Kimbell | 10—86 X |
| 2,887,157 | 5/1959 | Rehdorf | 72—327 |
| 2,898,788 | 8/1959 | Baxa | 10—86 |
| 2,909,281 | 10/1959 | Koskinen | 10—86 |
| 3,010,126 | 11/1961 | Wilcox | 10—86 X |
| 3,060,562 | 10/1962 | Franson | 10—86 X |
| 3,108,371 | 10/1963 | Munse | 72—356 X |
| 1,623,325 | 4/1927 | Wetmore | 72—327 |

CHARLES W. LANHAM, *Primary Examiner.*

E. SUTTON, *Assistant Examiner.*